July 23, 1940.  R. J. ADAMS  2,208,828
AUTOMOBILE GEARSHIFT
Filed Feb. 17, 1939  4 Sheets-Sheet 1

Inventor
Rudolph J. Adams
by J. Daniel Stuwe
Attorney.

July 23, 1940.  R. J. ADAMS  2,208,828
AUTOMOBILE GEARSHIFT
Filed Feb. 17, 1939  4 Sheets-Sheet 2
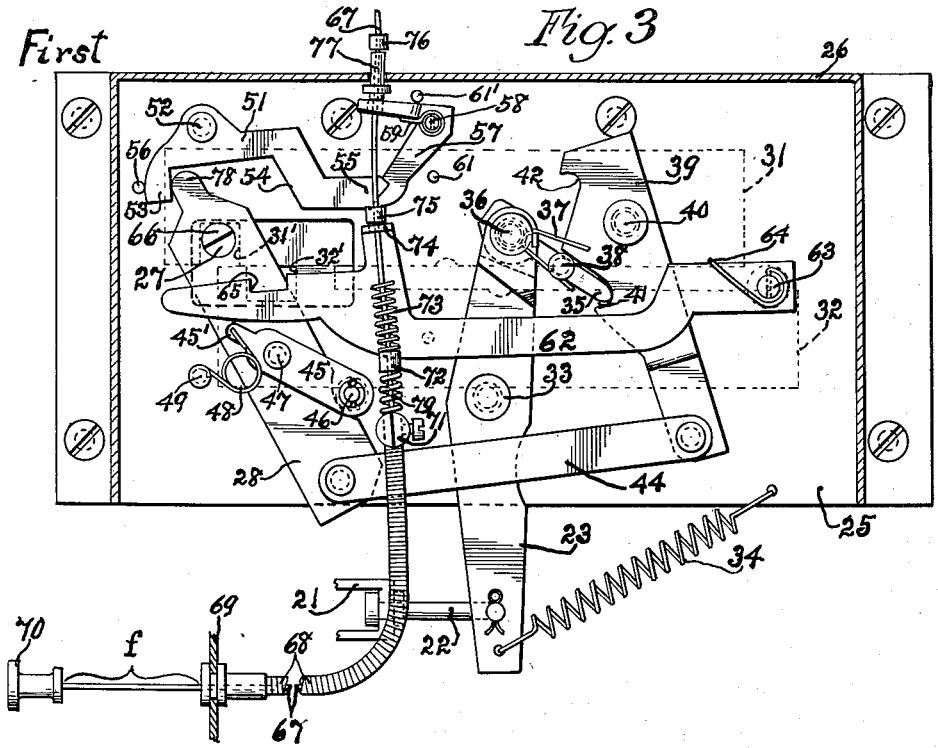
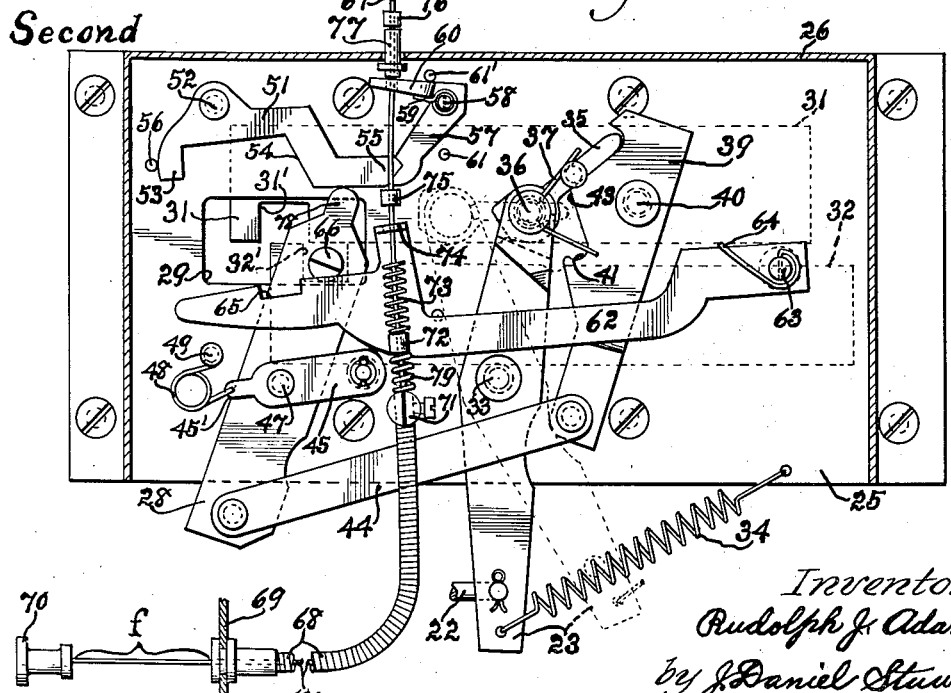
Inventor
Rudolph J. Adams
by J. Daniel Stuwe
Attorney.

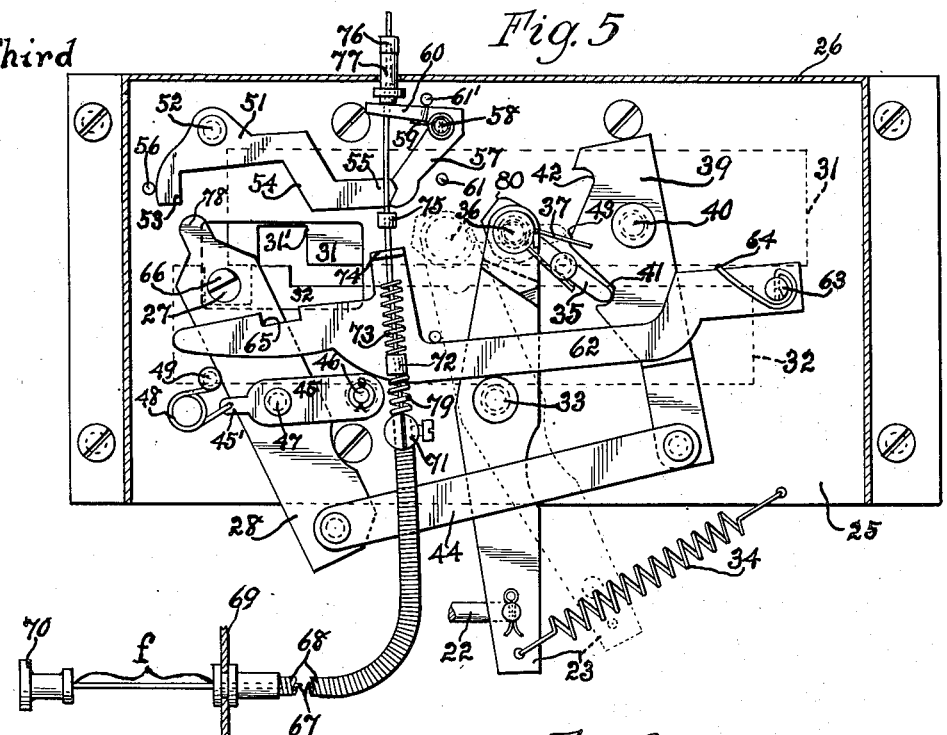
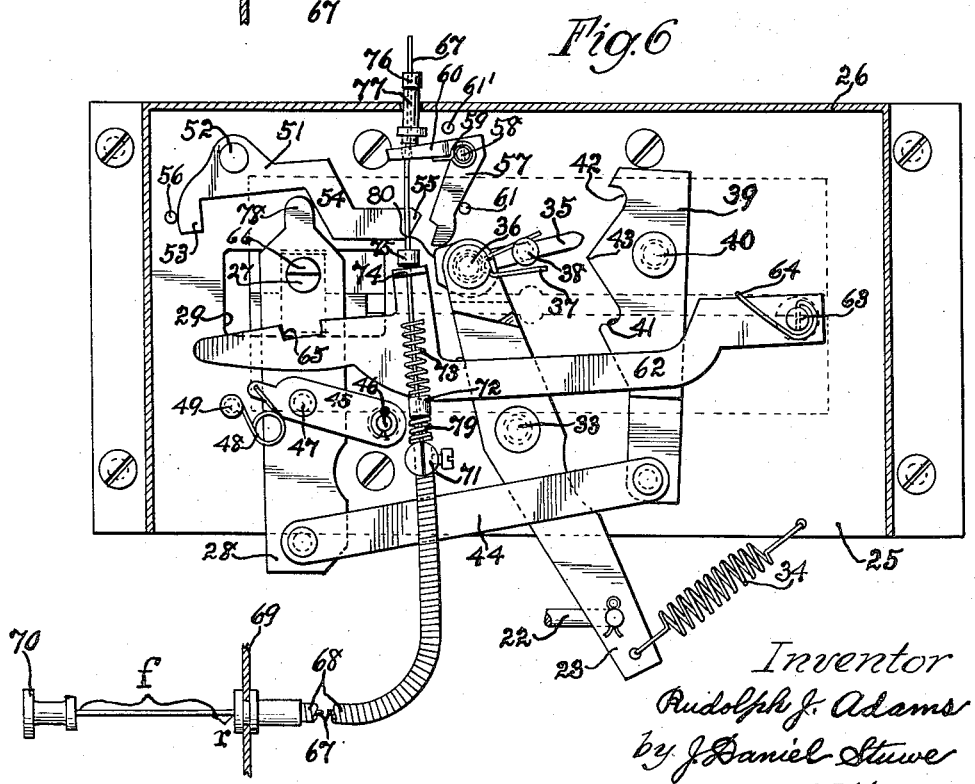

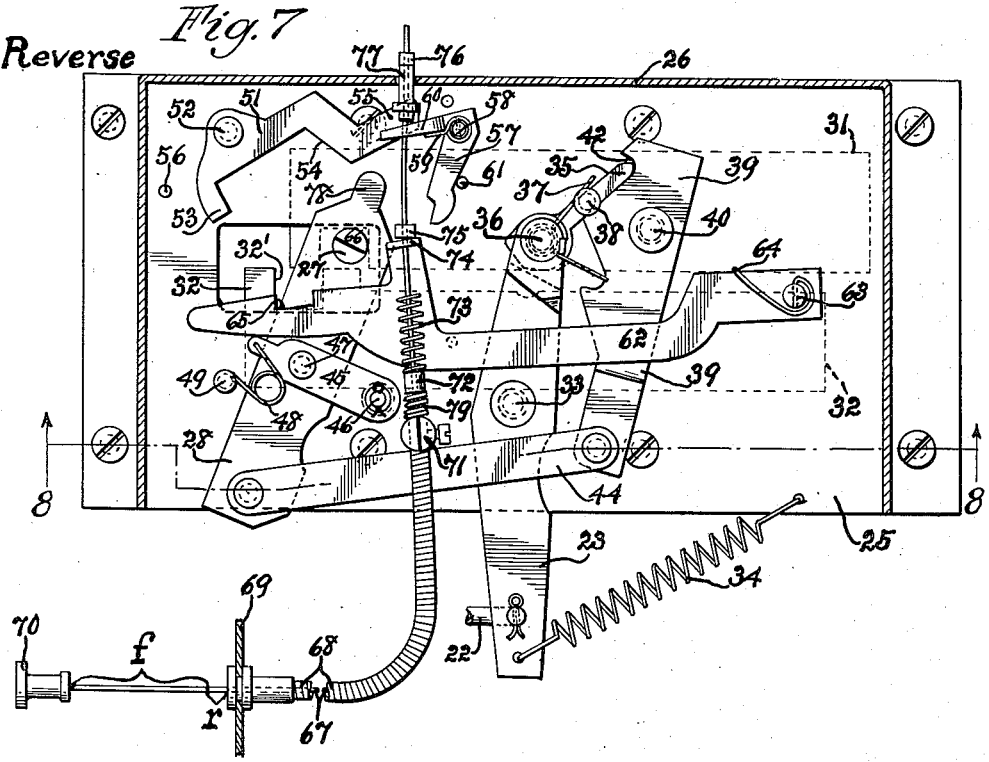
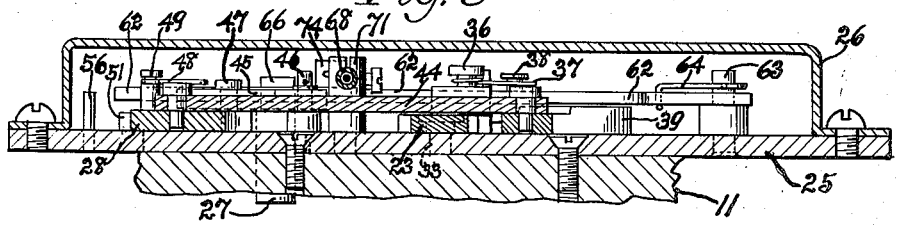
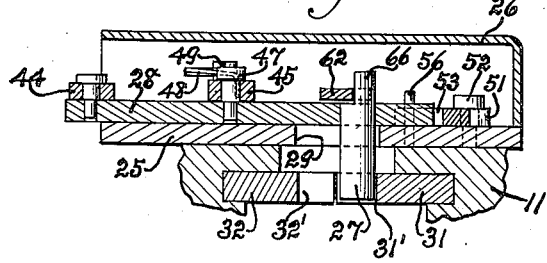
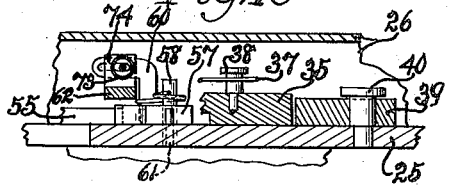

Patented July 23, 1940

2,208,828

UNITED STATES PATENT OFFICE 2,208,828

AUTOMOBILE GEARSHIFT

Rudolph J. Adams, Chicago, Ill.

Application February 17, 1939, Serial No. 256,975

17 Claims. (Cl. 192—3.5)

This invention relates to an improved automobile gearshift.

One of the objects of this invention is to provide a device for use in an automobile or similar motor vehicle for shifting the transmission gears thereof from one speed ratio to another, which device can be operated with the foot, preferably by operating the clutch pedal, so as to eliminate the customary shift lever and leave the hands free for steering, signaling, etc., and also leave more leg room in the automobile.

A more specific object of this invention is to provide such a gear shifting device which is operated by the clutch control means, and by operating the same in the customary manner for releasing the clutch, for example by depressing the clutch pedal, and which becomes effective for shifting the gears only after the clutch has been fully released, thereby preventing entirely any damaging or stripping of the gears by attempted gear shifting before the clutch is actually released.

Another object of this invention is to provide such a gear shifting device whereby the gears are gradually shifted from one speed to the adjoining one, and likewise placed in reverse position, thru an ordinary depressing of the standard clutch pedal in the customary manner, thereby first releasing the clutch and then shifting the gears.

Another object of this invention is to provide a compact, durable, and simple gear shifting device of this kind which is not expensive in its construction and which can also be readily installed in the automobile, requiring but very little change in the usual standard construction and equipment for installing it therein.

A more particular object of this invention is to provide a practical and simplified gear shifting device which can be readily installed in the modern types of automobiles, by simply removing the customary shift lever and transmission case cover from the modern standard transmission mechanism and conveniently mounting this shifting device in place thereof, and connecting it operatively with the clutch control means of the automobile, without requiring any modification or reconstruction of the usual clutch mechanism, whereby to shift the gears by the customary and already known operation of said control means, and yet permit the operation of the clutch in the usual way.

These and various other objects and advantages are attained with this invention as will become apparent from the following description, taken in connection with the accompanying drawings wherein this invention is shown in its preferred form of construction, it being understood that various other forms and modifications may be resorted to for carrying out the objects and purposes of this invention.

In the drawings:

Fig. 3 is a similar view, but illustrates the mechanism in the first or low speed position.

Fig. 4 illustrates the mechanism in the second or intermediate speed position.

Fig. 5 illustrates the mechanism in the third or high speed position.

Fig. 6 illustrates the mechanism in the neutral position, but the control means drawn to release the holding latch from the cam lever, ready to be shifted into reverse position.

Fig. 7 illustrates the entire device in the reverse position.

Fig. 8 is a vertical sectional view, taken on line 8—8 of Fig. 7.

Figure 2:
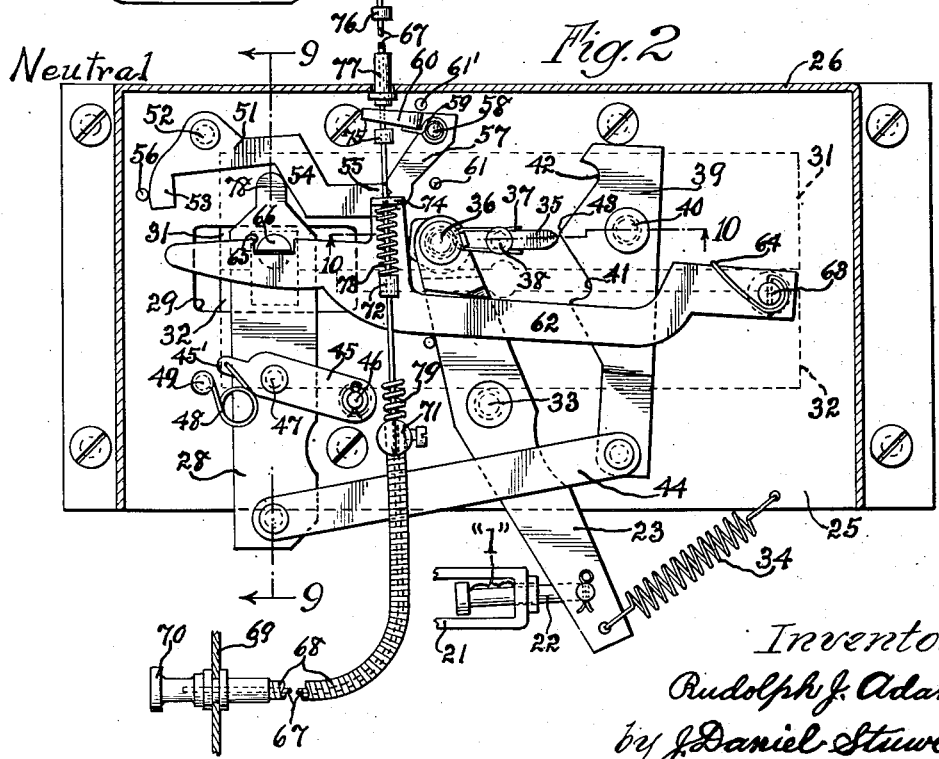
Fig. 2 is an enlarged horizontal sectional view, taken on line 2—2 of Fig. 1, illustrating the mechanism of the gear shifting device in the neutral position.

Figs. 9 and 10 are vertical sectional views, taken respectively on lines 9—9 and 10—10 of Fig. 2.

The drawings illustrate this invention in its preferred form of construction, arranged so as to be readily mounted on the case 11' of the transmission mechanism 11, and located beneath the floor 12 of a modern automobile or motor vehicle 13; said device being operatively connected with the control means 14 of the clutch mechanism 15, and preferably so as to be operable by the foot which bears on the clutch pedal 16 in the usual manner for actuating the clutch.

Figure 1:
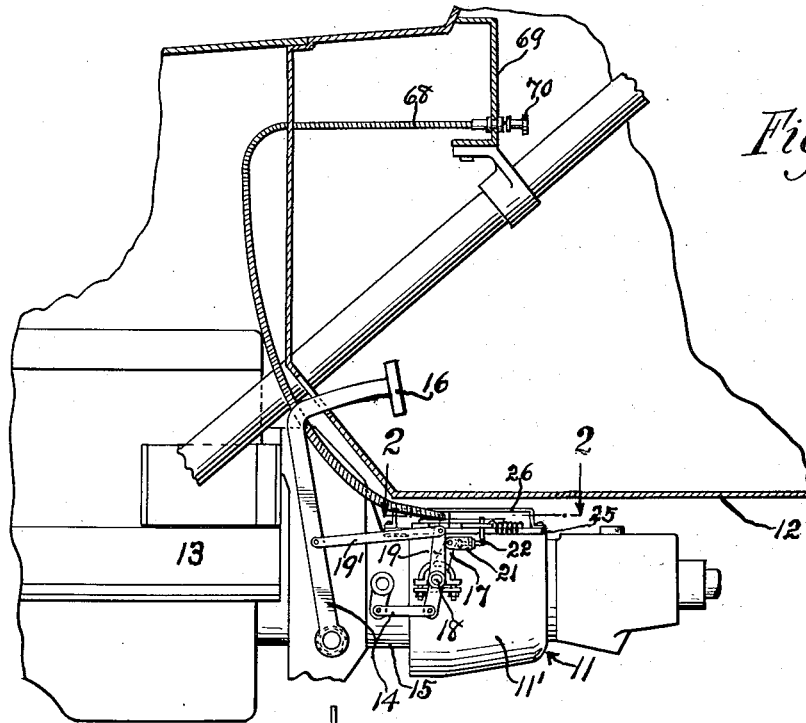
Fig. 1 is a side elevational view illustrating an embodiment of my invention in its preferred form, applied to a standard transmission and clutch mechanism of a modern automobile.

This device is arranged so it can be readily installed by any driver, and it is mounted on the transmission and is connected to the clutch means as best suits each automobile. In the illustrated form, as seen in Fig. 1, the connection with the clutch mechanism is effected by means of an arm or lever 17 which is preferably secured onto the shaft 18 of the clutch lever 19 which is actuated thru the link 19' by the clutch pedal 16, said arm 17 being connected thru a yoke 21 and a rod 22 extending therefrom to an operating lever 23 of the train of operating elements of this device, which are herein shown in the form of a train of levers and links.

The shifting device as disclosed comprises a main supporting member 25, which is shown in the form of a plate and has a cap or cover 26 thereon to provide a housing for the train of movable operating elements. The plate is arranged so that it can be readily mounted upon the case 11' of the transmission 11, and fits in place of the customary cover plate which has been removed. The usual gear shifting lever of the automobile is also removed along with the cover plate, thereby providing more leg room in the front part of the automobile; and in the position of the lower end of the shift lever a stub shaft or gear shifting post 27 is provided, which is secured in a shifting bar or lever 28 located slidably on plate 25, and this post is extended thru an opening 29 in the plate, being selectively engageable in the usual notches 31' and 32' provided in the customary shift bars 31 and 32, which are standard equipment of the modern transmission mechanism and are slidable longitudinally thereof.

The train of operating elements comprises connected and cooperating levers and links, which include the operating lever 23 and the shifting lever 28, all being supported on plate 25 and housed under the cover 26. The operating lever 23 is swingable on a pivot pin 33 secured on plate 25, and is normally held in its retracted or neutral position by a spring 34 which connects the outer end of said lever with said plate, as shown in Fig. 2 and in Fig. 6. The inner end of lever 23 carries a selector member or arm 35 pivoted by a pin 36 on the lever, and being urged into its neutral position by a forked spring 37 on said lever bearing on the opposite sides of a pin 38 arising from said arm.

A selector lever 39 is pivoted by a pin 40 on plate 25, and is provided with selector notches 41 and 42 on the two sides of a ridge 43, the lever being operatively connected by a link 44 with the shifting lever 28. The selector arm 35 is selectively engageable in said notches 41 and 42 for shifting the train of movable elements and thereby the transmission gears; and it engages in notch 41 to shift said elements from the neutral position shown in Fig. 2 to the first speed position shown in Fig. 3, upon depressing pedal 16 and actuating elements 17 to 23.

A shifting link or arm 45 has one end pivoted by a pin 46 on plate 25, and is connected adjacent its other end by a pin 47 to lever 28. A spring 48 is secured by a pin 49 on plate 25 and is attached to the end 45' of link 45 for swinging the link on its pivot pin 46 and thereby snapping or fully moving lever 28 with its post 27 into notch 31' in plate 31, as shown in Fig. 3, or into notch 32' in plate 32, as shown in Fig. 4, and to retain said lever firmly in position.

A cam member or lever 51 is pivoted by a pin 52 on plate 25, and includes a stop lug 53 at one end and a cam shoulder 54 at the opposite end having a holding finger 55 extending therefrom, said cam lever being held in its forward speed position by a stop pin 56 engaging lug 53, and by a locking latch 57 engaging finger 55. Said latch is pivoted by a pin 58 secured on plate 25, as best shown in Figs. 2 and 10, and is held in its locking position by a spring 59 on the pin which engages an off-set operating finger 60 on the latch and presses it against a stop pin 61'. A stop pin 61 limits the release movement of said latch when shifted to its reverse position, from the position shown in Fig. 6 to that shown in Fig. 7.

A lockbar 62 is pivoted at one end on plate 25 by a pin 63 and has a spring 64 at said end to urge the bar out of its locking position. Said bar has a notch 65 provided adjacent its opposite end adapted to receive the protruding upper end 66 of shifting post 27, whereby to retain said shifting post and the shifting lever 28 in the neutral position, as indicated in Fig. 2.

Control means is provided for setting the shifting device either in its neutral or locked position, as shown in Fig. 2, and to free it from being operated by operation of the clutch; or to set the device in its operative forward drive position, to be actuated by operation of the clutch for shifting the transmission gears from one forward speed to another; and also to set the device in its reverse position to be actuated by operation of the clutch for effecting a reverse drive. This control means includes a control wire 67 slidable in a cable 68 which has its outer end secured on the panel board 69, said wire having on its outer end an operating button or knob 70 which is conveniently positioned at the inner side of said panel board 69. The inner end of cable 68 is secured by a post 71 on plate 25, and the inner end of wire 67 extends thru housing 26. A stop collar 72 is secured on said wire, and a spring 73 on the wire bears against the stop and against a lug 74 on lockbar 62, whereby to normally retain the bar in its locking position for holding the elements in the neutral position, as shown in Fig. 2. A collar 75 is secured on the wire and engages lug 74 for positively moving lockbar 62 out of its locking position when knob 70 is drawn from the neutral into the forward speed position, as shown in Figs. 3 to 5. With the above arrangements and conditions the device and gears can be shifted thru the operation of the clutch for effecting the forward speeds only.

For the purpose of effecting a reverse drive, a stop collar 76 is secured on the end of wire 67, and as button 70 is pulled an additional distance r inward of the panel board, as shown in Figs. 6 and 7, beyond the distance f used for forward speeds, as shown in Figs. 3, 4, and 5, said stop collar 76 then engages a sleeve 77 which is movably mounted in casing 26, and with the sleeve engages arm 60 of latch 57 and moves it away from stop pin 61', as shown in Fig. 5, inwardly to bring the latch against stop pin 61 and to release the latch from finger 55 on cam lever 51. In the meantime collar 72 has depressed a strong spring 79, as indicated in Fig. 6, which normally retained said collar 72 and wire 67 in forward speed position. Then by the next operation of the clutch pedal the finger 78 on the end of lever 28 will move the cam bar out of the position shown in Fig. 6 into the position shown in Fig. 7, which is the reverse position of this shifting device and the transmission gears. The unlocking of the cam bar has enabled finger 78 to move freely towards the reverse position, instead of being shifted by cam shoulder 54 into its second speed position, as shown in Fig. 4.

This gear shifting device is arranged to be easily installed in the modern motor vehicle, by removing the usual gear shift lever and the cover plate from the transmission casing; and substituting plate 25 for said cover plate, with shifting post 27 entered in the transmission to engage its shifting bars, in place of the removed shift lever. Yoke 21 is then connected with the clutch operating means, as by securing arm 17 onto shaft 18 which extends from the clutch operating lever 19; so that the depression of clutch pedal 16 will first release the clutch while yoke 21

21 slides thru the lost motion distance *l* on rod 22, and will thereafter actuate the operating mechanism of this device.

*Operation of the device.*—The gear shifting mechanism disclosed herein and as described above, is normally placed in the neutral position with the control means and its knob 70 and the train of movable elements in the device all placed in the neutral position and locked therein, as shown in Fig. 2 of the drawings. When it is desired to shift the transmission gears, knob 70 with wire 67 is drawn from the panel board 69, to the distance *f* for effecting the forward speeds, as shown in Figs. 3, 4, and 5. This moves stop collar 75 against lug 74 and releases the lockbar 62 from the upper end 66 of the shifting post 27, as indicated in Fig. 3; whereupon the depressing of clutch pedal 16 will first fully release the clutch and thereby move yoke 21 on rod 22 thru the distance *l* of lost motion on said rod; and by a slightly further depression of the clutch pedal it will move said yoke and rod and connected lever 23 to the position shown in Fig. 3, thereby also moving the shifting lever 28 and shifting post 27 into the first speed position, where the finger 78 of lever 28 engages stop lug 53 on cam lever 51. During this operation the spring 48 with link 45 has been instrumental in shoving or snapping the lever 28 from its neutral position up fully into said first speed position, with finger 78 against lug 53 on the cam lever. The mechanism is thus held in the first speed position.

When the clutch pedal is released after effecting the first speed position, the operating lever 23 will be drawn back by spring 34 from the position shown in Fig. 3 to the position shown in dotted lines in Fig. 5, and the selector arm 35 is thereby drawn from notch 41 beyond ridge 43 towards notch 42, as shown by dotted line in Fig. 5.

When the clutch pedal 16 is next depressed for effecting the gearshift into second speed position, lever 23 and arm 35 will shift selector lever 39 from the position shown in Fig. 3 to the position shown in Fig. 4, thereby shifting lever 28, by its finger 78 sliding along shoulder 54, thus moving pin 27 into notch 32' of shift bar 32; and thereby also shifting lever 45 with its spring 48, and said spring thus snaps this lever fully into the second speed position.

Upon releasing clutch pedal 16 the lever 23 with selector arm 35 are again drawn by spring 34 into the retracted position, as best indicated by the dotted lines in Fig. 4, so that arm 35 has been moved from notch 42 past ridge 43 toward notch 41. When the clutch pedal 16 is next fully depressed and the clutch has been released, then the further depression of the pedal will move selector lever 39 from the position shown in Fig. 4 to the position shown in Fig. 5, and thereby moving the shifting lever 28 and shifting post 27 into the third speed position, as shown in Fig. 5.

Upon releasing the clutch pedal 16, the operating lever 23 with its arm 35 will again be drawn by spring 34 into the position shown in dotted lines in Fig. 5.

To shift from third speed back to second speed, since the operating lever 23 and selector arm 35 have been returned thru the action of spring 34 to the dotted line position shown in Fig. 5, it is then merely necessary to again depress the clutch pedal, whereby said arm 35 shifts selector lever 39 and connected shifting members back into second speed position, as shown in Fig. 4.

If it is desired to shift back to neutral, then the control means with knob 70 is shifted back to neutral position, thereby moving spring 73 against lug 74 of lockbar 62 and moving said lockbar back to neutral, and the clutch pedal is then depressed, thereby returning the elements to such neutral position as shown in Fig. 2.

For effecting the reverse speed the control knob 70 is drawn further from the panel board, for the additional distance *r* as indicated in Figs. 6 and 7, whereby collar 76 on wire 67 has moved sleeve 77 and therewith arm 60 with its latch 57, as shown in Fig. 6, thereby releasing cam lever 51; and the end of the latch has also engaged the protruding pivoted end 80 of arm 35 and swung said arm from notch 41 past ridge 43 towards notch 42, as shown in Fig. 6. Upon depressing the clutch pedal 16 the operating lever 23 and arm 35 will swing lever 39 and thereby the connected elements with lever 28 and its shifting post 27 into the reverse position, and also swinging the released cam lever 51, thru the action of the finger 78 against shoulder 54, as best shown in Fig. 7, for effecting a reverse drive of the transmission and the automobile.

If the control knob 70 is next depressed to its forward speed position, and the clutch pedal is then depressed, the device will be shifted back by the expansion of spring 79 from said reverse position to the first speed position as shown in Fig. 3; and if knob 70 is fully depressed to neutral position then spring 73 will move lockbar 62 into its locking position as shown in Fig. 2, and the movable elements will be retained in the retracted or neutral position.

I claim:

1. A gearshifting device for an automobile or the like having a transmission of the type customarily operable by a shift lever, also a clutch with means for releasing it, said shifting device comprising a member entering the transmission, instead of the aforesaid customary shift lever, movable operating elements connected with said member, means connecting said operating elements with said clutch releasing means for shifting the transmission from one speed to another by the operation of said releasing means and after the clutch has been released, and control means operable for selectively locking the device in neutral position, uneffected during operation of the clutch releasing means, or for rendering the device operative with the operation of said releasing means.

2. In an automobile or the like having a transmission with a casing and a clutch mechanism with foot actuated means therefor, a shifting device comprising a housing mountable on the transmission casing and including shifting means covered by said housing and entering said casing, operating means in said housing and connected with said shifting means, means connecting said operating means with the clutch mechanism for shifting the transmission by operating the foot actuated means, and control means including locking means mounted in the housing whereby to lock the movable operating means in neutral position uneffected by action of the clutch, also a manually actuated member connected with the locking means and conveniently operable for placing the latter either in its locked position or in its release position.

3. A gearshifting device adapted for an automobile or the like having a transmission of the type customarily operable by a shift lever and a clutch mechanism operated by a pedal, said shifting device being mountable on the transmission casing and including a shifting member entering the casing in place of the aforesaid shift lever, an operating member in the device operatively connected with the clutch mechanism to be operated by depressing the clutch pedal, a train of movable operating elements including said operating member and said shifting member, locking means for retaining said shifting member secured in its neutral position, and control means associated with said locking means and operable to either set the device in its neutral position unaffected by the movement of the clutch pedal, or to place it either in a forward speed position or else in a reverse drive position for actuation by operation of the clutch pedal.

4. The subject matter set forth in claim 3, wherein the device and its connection with the clutch pedal is arranged to be operated by depressing said pedal after the clutch has been fully released.

5. A gearshifting device adapted to be substituted for the customary shift lever and cover plate which are removably mounted on the top of a standard transmission of an automobile having a standard clutch and control means therefor, said device being in the form of a unit comprising a supporting plate readily mountable upon the transmission case in place of the transmission case cover plate and being substantially of the same size, means supported on said supporting plate and carrying a short shaft arranged to be engageable in the customary pair of notches provided in the pair of standard gear shifting rails, in place of the shifting lever, operating means mounted on said supporting member for sliding said short shaft into either one of said notches, and means connecting said operating means with the clutch control means, for shifting the shaft and thereby the transmission rails and gears from one speed to another by the operation of said standard clutch control means in the usual way.

6. A device for shifting the rails and gears in a standard transmission of an automobile having a clutch and standard control means therefor, said device comprising a base plate with a housing thereon and adapted to be readily mounted upon the transmission case in place of the conventional transmission case cover and shifting lever associated therewith, gearshifting means in said housing including a shifting member having an element depending thru said plate for engaging and actuating said gearshifting rails, in place of the shifting lever, a train of operating elements mounted in said housing, including a pair of co-engageable selector members, one of which members is pivotally carried by said plate, and an operating member pivotally carried by the plate and carrying the other of said selector members and being operatively connected with the clutch control means for shifting said depending element and the transmission by operation of the standard clutch control means in the usual way and after the clutch has been released.

7. The subject matter set forth in claim 6, wherein control means is provided including a finger actuated member which is connected with the train of operating elements and is readily operable from the driver's seat in the automobile for selectively placing the shifting device either in a neutral position, or in a forward speed position, or in a reverse drive position.

8. A gearshifting device adapted to be substituted for the customary shift lever and cover plate which are removably mounted upon a standard transmission of an automobile having a casing and a pair of standard shift rails therein, a clutch mechanism with an operating pedal therefor, said device comprising a supporting plate readily mountable in place of the transmission case cover and being substantially of the same size, a gearshifting member slidable on said plate and carrying a stub shaft which depends therefrom and is arranged to enter the transmission case and to be slidable into either one of the notches conventionally provided in said pair of standard shift rails, in place of the usual shifting lever, a train of operating elements mounted on said plate and connected with said shifting member, means connecting said operating elements with the clutch mechanism for shifting the shaft and thereby the transmission from one speed to another by the depressing of said clutch pedal merely in the usual downward direction, and means manually operable for setting the device either in its neutral position or in its operative position.

9. A gearshifting device for an automobile having a transmission with several forward speeds and a reverse speed, also a clutch mechanism with an operating pedal, a gearshifting device mountable on the transmission case and comprising a gearshifting member in the device carrying a stub shaft which enters the transmission in place of the ordinary shift lever, a train of connecting elements connected with said shifting member for actuating it, means connecting said train of elements with the clutch mechanism to be shifted from one speed to another by depressing said pedal, and control means including locking means in the device for rendering the device inoperative upon operation of the clutch pedal, also means manually operable for releasing the locking means and rendering the device operative thru operation of the clutch pedal, for shifting to the desired forward speed or into reverse by depression of the clutch pedal.

10. A device for shifting the transmission rails and gears of an automobile having a clutch with control means therefor, said device comprising a base plate with a housing thereon and adapted to be mounted on the transmission case in place of the transmission case cover, gearshifting means and cooperating cam means provided with cam holding means in said housing, the shifting means including a shaft extending thru said plate for engaging and actuating said gearshifting rails, a train of operating elements mounted in said housing connected to said shifting means, means connecting said train of operating elements with the clutch control means to actuate said elements for shifting the transmission by operation of the clutch means, and control means operable for selectively placing the shifting device in a neutral position, or in an operative position for actuation by the clutch control means for shifting to a forward speed and also for moving said cam holding means and releasing said cam means to permit a shift to reverse.

11. The subject matter set forth in claim 10, wherein the control means is provided with locking means mounted in the housing and engaging said shaft to lock the gearshifting means in neutral position uneffected by action of the clutch, and the control means including a conveniently operable member on the panel board for actuating said cam holding means and said locking means.

12. A gearshifting device adapted for an automobile or the like having a standard transmission of the type usually operable by a shift lever, also a clutch mechanism operated by a pedal, said shifting device comprising a supporting plate mountable on the transmission casing to serve as its cover, a shifting member supported on said plate and carrying a shaft which enters the casing, in place of the usual shift lever aforesaid, an operating member supported on the plate and operatively connected with the clutch mechanism to be operated by depressing the clutch pedal, cooperating selector members one connected with the shifting member and the other with the operating member, means for retaining said shifting member secured in its neutral position, and control means associated with said retaining means and operable to selectively set the device in its neutral position, or to place it either in a forward speed position or else in a reverse drive position.

13. The subject matter set forth in claim 12, and including cam means coacting with said shifting member, also latch means for holding the cam means and being releasable therefrom by operating the control means whereby to free the cam means from the shifting member for effecting a shifting of the transmission into reverse.

14. A device for shifting the gears of a standard transmission of an automobile from one forward speed to another or into reverse, said device comprising a base member adapted to be mounted on the transmission case, a shifting member mounted on said base member and carrying an element extending thru the latter into said case for shifting the gears, cam means cooperating with said shifting member while the latter moves to a forward speed position, means to retain said cam means in place, locking means to secure said shifting member in neutral position, operating means on said base member being connected with said shifting member and adapted to be operated by foot-actuated means of the automobile, and conveniently adjustable manual control means connected with said cam retaining means and said locking means, whereby to move the latter into its locked position, or into its unlocked position and provide for shifting the gears thru operation of said foot-actuated means into forward speed and likewise into reverse, and whereby also to release said retaining means from the cam means and free the latter from the shifting member during shifting into reverse.

15. The subject matter set forth in claim 14, wherein the operating means comprises a selector lever and a selector arm to actuate it for effecting the selected shift, and said cam retaining means will, while being released by the control means, tilt said arm for shifting into reverse.

16. A gearshifting device for an automobile having a clutch mechanism operated by a pedal and also a standard transmission including a pair of notched shift rails, said device comprising a supporting plate which is readily mountable on the transmission casing, in place of the customary casing cover, a shifting member supported on said plate and carrying an element which enters the casing and is adapted to be selectively engaged in the shift rail notches, in place of the standard shift lever, an operating member supported by the plate and operatively connected with the clutch operating pedal, a pair of cooperating selector members, one of which is pivotally supported by the plate and is operatively connected with the shifting member and the other of which is carried by the operating member and actuated thereby, for shifting the gears from one speed to another upon operation of the clutch pedal, and control means operable for retaining the shifting member in its neutral position inoperative during operation of said clutch pedal.

17. A gearshifting device for an automobile having a clutch mechanism operated by a pedal and also a stadard transmission including a casing and a pair of notched shift rails therein, said device comprising a supporting plate which is readily mountable on said casing, in place of the customary casing cover, a shifting member supported by the plate and carrying an element which enters the casing and is adapted to be selectively engaged in the shift rail notches, in place of the standard shift lever, an operating member supported by the plate and being operatively connected with the clutch operating pedal, cooperating selector means supported by the plate and being operatively connected with the shifting member and the operating member, cam means coacting with the shifting member in effecting the forward speeds, means for holding the cam means in its forward speed position, whereby to shift the transmission in its forward speeds thru operation of the clutch pedal, means for selectively retaining the shifting member inoperative during operation of said pedal, and control means operable for releasing said retaining means to enable shifting thru the forward speeds and also operable for releasing said cam holding means to permit a shift to reverse.

RUDOLPH J. ADAMS.